(12) United States Patent
Cho et al.

(10) Patent No.: US 9,132,828 B2
(45) Date of Patent: Sep. 15, 2015

(54) SHIFT CONTROL METHOD IN DCT VEHICLE

(71) Applicant: Hyundai Motor Company, Seoul (KR)

(72) Inventors: Sung Hyun Cho, Yongin-si (KR); Hwan Hur, Gunpo-si (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/500,256

(22) Filed: Sep. 29, 2014

(65) Prior Publication Data

US 2015/0166040 A1    Jun. 18, 2015

(30) Foreign Application Priority Data

Dec. 18, 2013    (KR) .......................... 10-2013-0157741

(51) Int. Cl.
*F16H 59/14*    (2006.01)
*F16H 59/66*    (2006.01)
*B60W 10/02*    (2006.01)
*B60W 10/113*    (2012.01)

(52) U.S. Cl.
CPC .............. *B60W 10/113* (2013.01); *B60W 10/02* (2013.01); *B60W 2510/025* (2013.01); *B60W 2550/14* (2013.01); *F16H 59/141* (2013.01); *F16H 59/66* (2013.01); *F16H 2306/42* (2013.01)

(58) Field of Classification Search
CPC ................... B60W 2510/025; B60W 2550/14; F16H 59/66; F16H 59/141; F16H 2306/42
See application file for complete search history.

(56) References Cited

U.S. PATENT DOCUMENTS

| | | | |
|---|---|---|---|
| 2004/0255707 A1 | 12/2004 | Preisner et al. | |
| 2006/0046896 A1* | 3/2006 | Nakajima et al. | 477/107 |
| 2007/0219698 A1 | 9/2007 | McDonald et al. | |
| 2008/0248922 A1* | 10/2008 | Heinzelmann et al. | 477/109 |
| 2009/0143950 A1* | 6/2009 | Hasegawa et al. | 701/68 |
| 2013/0304293 A1* | 11/2013 | Yoshikawa et al. | 701/22 |

FOREIGN PATENT DOCUMENTS

| | | |
|---|---|---|
| JP | 2007-92814 A | 4/2007 |
| JP | 2007-239832 A | 9/2007 |
| JP | 2008-106821 A | 5/2008 |
| JP | 2011-69390 A | 4/2011 |
| JP | 2013-87800 A | 5/2013 |
| KR | 10-0793886 B1 | 1/2008 |

* cited by examiner

*Primary Examiner* — Tisha Lewis

(74) *Attorney, Agent, or Firm* — Morgan, Lewis & Bockius LLP

(57) ABSTRACT

A shift control method in a vehicle having a dual clutch transmission may include determining whether or not power-off downshifting is started and whether or not torque handover is started, determining whether or not the vehicle has entered a rough terrain, calculating and storing a speed change rate of an engaging input shaft right before the vehicle enters the rough terrain, calculating a target transfer torque of an engaging clutch, and gradually increasing a transfer torque of the engaging clutch by an amount until arriving at the target transfer torque of the engaging clutch, controlling the target transfer torque of the engaging clutch to be maintained until a slip rate arrives at a reference value, and completing the power-off downshifting by gradually reducing the transfer torque of the engaging clutch by the amount of torque that the engaging clutch was gradually increased.

6 Claims, 2 Drawing Sheets

SHIFT CONTROL METHOD IN DCT VEHICLE

CROSS REFERENCE TO RELATED APPLICATION

The present application claims priority to Korean Patent Application Number 10-2013-0157741 filed Dec. 18, 2013, the entire contents of which is incorporated herein for all purposes by this reference.

BACKGROUND OF THE INVENTION

1. Field of the Invention

The present invention relates, in general, to a shift control method in a dual clutch transmission (DCT) (hereinafter referred to as the "DCT vehicle") and, more particularly, to a shift control technology for a vehicle that is traversing on rough terrain during power-off downshifting.

2. Description of Related Art

A DCT is a transmission that uses two clutches as well as a transmission mechanism of a conventional manual transmission, in which actual gear shifting is carried out through conversion of the engagement status of two clutches in the state in which shifting gears of a target shift stage are previously fastened.

With an automatic transmission having a conventional torque converter, it is relatively easy to achieve a smooth and comfortable feeling of shifting since the torque converter absorbs shock that occurs during shifting through fluid slip. In contrast, a DCT does not have a device which absorbs shock that occurs during shifting since it does not have a torque converter. In the DCT, the two clutches must be very precisely controlled during shifting in order to achieve a smooth and comfortable feeling of shifting. When the two clutches are implemented as dry clutches, more precise control is required.

During power-off downshifting, an input shaft speed change rate, which is a differential component of an input shaft speed, is used for the purpose of shift control. The input shaft speed change rate is influenced by the conditions of the road on which the vehicle is traversing. Although typical flat road conditions are not a serious problem, a concave-convex road or rough terrain makes the shift control difficult since it is difficult to obtain reliable values from the concave-convex or rough terrain.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of, the present invention are directed to providing a shift control method in a DCT vehicle, in which smooth and reliable shift control can be carried out when a vehicle enters rough terrain while power-off downshifting to a lower gear is being carried out in the state in which a driver has not stepped on an accelerator pedal, whereby the endurance of a clutch is improved by a reduced shifting shock, and the value of the vehicle can be improved.

In an aspect of the present invention, a shift control method in a vehicle having a dual clutch transmission may include determining whether or not power-off downshifting is started and whether or not torque handover is started, determining whether or not the vehicle may have entered a rough terrain, when the torque handover is started, determining and storing a speed change rate of an engaging input shaft before the vehicle enters the rough terrain when it is determined that the vehicle may have entered the rough terrain, determining a target transfer torque of an engaging clutch based on the speed change rate of the engaging input shaft that is stored during determining and storing the speed change rate of the engaging input shaft when the vehicle may have entered an actual shifting section, and increasing a transfer torque of the engaging clutch by an amount until arriving at the target transfer torque of the engaging clutch, controlling the target transfer torque of the engaging clutch to be maintained until a slip rate arrives at a reference value after determining the target transfer torque of the engaging clutch, and completing the power-off downshifting by reducing the transfer torque of the engaging clutch by the amount of torque that the engaging clutch was increased at the step of increasing the transfer torque of the engaging clutch when controlling the target transfer torque of the engaging clutch is completed.

Determining whether or not the vehicle may have entered the rough terrain may include determining that the vehicle may have entered the rough terrain when a present speed change rate of the engaging input shaft differs from an average speed change rate of the engaging input shaft for a reference period of time by a marginal value or greater.

Determining the target transfer torque of the engaging clutch may include determining the target transfer torque of the engaging clutch by a formula of $$T_c = -T_e + J_e\left(\frac{d\text{SLIP}}{dt} + \frac{dNi1}{dt}\right),$$

wherein the Tc is the transfer torque of the engaging clutch, the Te is an engine torque, the Je is a moment of inertia of an engine, and the SLIP is Ni1-Ne, wherein the Ni1 is a speed of the engaging input shaft, and the Ne is an engine speed.

Controlling the target transfer torque of the engaging clutch may include determining the slip rate based on a difference between a speed of the engaging input shaft and an engine speed with respect to a difference between a speed of the engaging input shaft and a speed of the disengaging input shaft.

In controlling the target transfer torque of the engaging clutch, a reference value of the slip rate is 9/10 or greater.

Determining the slip rate may include determining the slip rate by a formula of $$\text{Slip rate} = \frac{Ni1 - Ne}{Ni1 - Ni2},$$

wherein the Ni2 is a speed of the disengaging input shaft.

According to the present invention as set forth above, when a vehicle enters rough terrain while power-off downshifting to a lower gear is being carried out in the state in which a driver has not stepped on an accelerator pedal, smooth and reliable shift control can be carried out in order to improve the endurance of a clutch by a reduced shifting shock and improve the value of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In various aspects of the present invention, a vehicle having a dual clutch transmission (DCT) employs a controller to perform a series of steps in a shift control method in the DCT vehicle.

The controller can be realized by one or more processors activated by a predetermined program, and the predetermined program can be programmed to perform each step of a control method for a vehicle having a dual clutch transmission (DCT) according to an exemplary embodiment of this invention.

Figure 1:
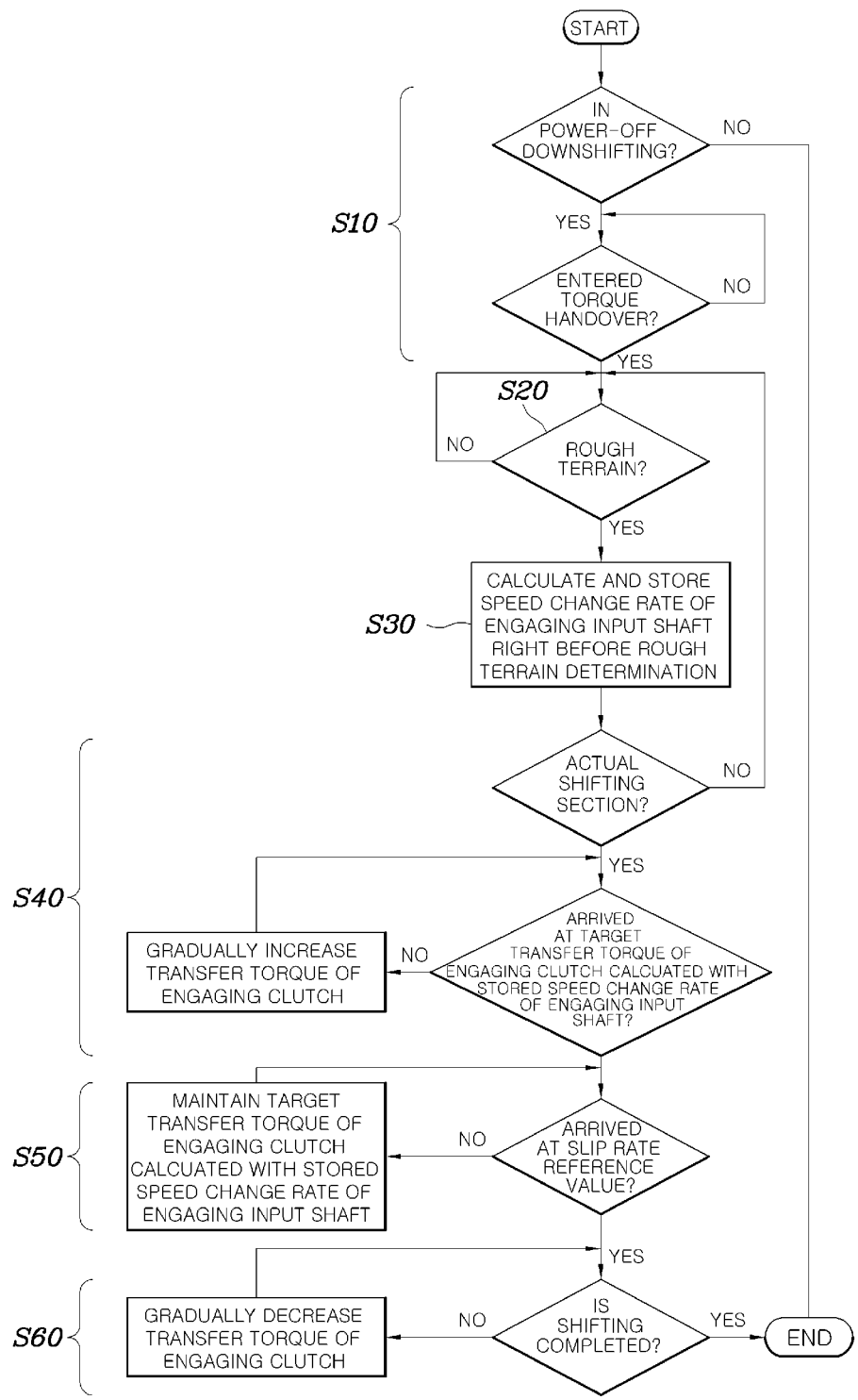
FIG. 1 is a flowchart showing an exemplary shift control method in a DCT vehicle according to the present invention.
Figure 2:
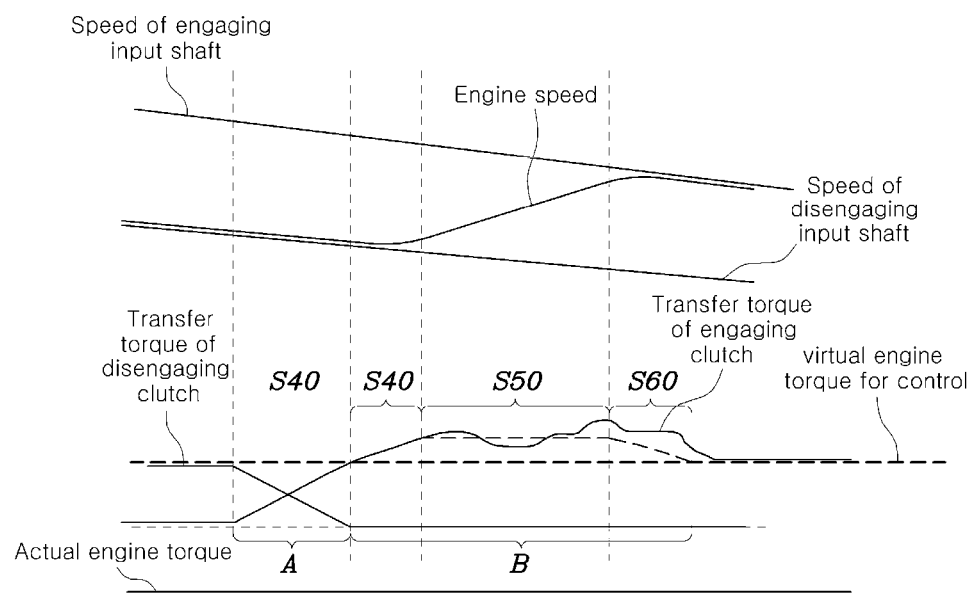
FIG. 2 is a graph illustrating the exemplary shift control method in a DCT vehicle according to the present invention.

Referring to FIG. 1 and FIG. 2, various embodiments of a shift control method in a DCT vehicle according to the present invention include a shift determination step S10 of determining whether or not power-off downshifting is started and whether or not torque handover is started, a rough terrain determination step S20 of determining whether or not a vehicle has entered rough terrain if the torque handover is started, a change rate obtaining step S30 of calculating and storing a speed change rate of an engaging input shaft right before the vehicle enters the rough terrain if it is determined that the vehicle has entered the rough terrain, a transfer torque increasing steps S40 of, if the vehicle has entered an actual shifting section, calculating a target transfer torque of an engaging clutch based on the speed change rate of the engaging input shaft that is stored at the change rate obtaining step S30, and gradually increasing a transfer torque of the engaging clutch until arriving at the target transfer torque of the engaging clutch, a transfer torque maintaining step S50 of controlling the target transfer torque of the engaging clutch to be maintained until a slip rate arrives at a reference value after the transfer torque increasing step S40, and a shift completing step S60 of completing the power-off downshifting by gradually reducing the transfer torque of the engaging clutch by an amount of torque that is increased at the transfer torque increasing step S40 when the transfer torque maintaining step S50 is completed.

When it is determined at the rough terrain determination step S20 that the vehicle has entered the rough terrain during the power-off downshifting, the present invention calculates the speed change rate depending on the speed of the engaging input shaft that is measured before the vehicle enters the rough terrain such that the calculated speed change rate is used in a later control process. Consequently, when the vehicle has entered the rough terrain during the power-off downshifting, the vehicle can be prevented from being improperly shift-controlled in response to the speed of the engaging input shaft being rapidly changed.

For example, when the vehicle has entered the rough terrain such as a concave-convex road or an unpaved road, controlling the transfer torque of the engaging clutch in the actual shifting section includes calculating the target transfer torque of the engaging clutch with the speed change rate calculated depending on the speed of the engaging input shaft that is measured before the vehicle enters the rough terrain.

Of course, when the vehicle has not entered the rough terrain, the speed change rate is calculated depending on the speed of the engaging input shaft that is being continuously measured at present as in the related art. The target transfer torque of the engaging clutch is calculated based on the calculated speed change rate. Then, the engaging clutch is controlled based on the target transfer torque of the engaging clutch that is calculated in this manner.

The speed of the engaging clutch, which is measured right before the vehicle enters the rough terrain and is used if it is determined that the vehicle has entered the rough terrain, can be substituted with an average speed of the engaging clutch that has been cumulatively calculated right before the entrance into the rough terrain. That is, the average speed of the engaging clutch that has been calculated for a preset period of time right before the entrance into the rough terrain or the speed of the engaging clutch that is measured at one point of time can be used.

For reference, the torque handover refers to the process of releasing the torque of a disengaging clutch while increasing the torque of an engaging clutch for shifting such that the two clutches have opposite situations. The actual shifting section refers to an inertia area in which the speed of the engine changes and actual shifting is carried out after the torque handover, i.e. a torque area in which only the torques are changed. In FIG. 2, reference sign "A" indicates the torque handover section, and reference sign "B" indicates the actual shifting section.

The rough terrain determination step S20 determines that the vehicle has entered the rough terrain if a present speed change rate of the engaging input shaft differs from an average speed change rate of the engaging input shaft for a reference period of time by a marginal value or greater.

For example, when the average speed change rate of the engaging input shaft has been continuously calculated by 50 ms, if the speed change rate of the engaging input shaft that is measured at present is significantly greater or smaller than the average speed change rate by the marginal value or greater, it is regarded that the vehicle has entered the rough terrain.

Therefore, the marginal value is a level, on the basis of which the rough terrain can be determined, and which can be decided through a multiplicity of experiments and analyses.

At the transfer torque increasing step S40, the target transfer torque of the engaging clutch is calculated based on the engine torque, the speed change rate of the input shaft, the moment of inertia of the engine, the speed of the engaging input shaft and the engine speed.

That is, the target transfer torque of the engaging clutch is calculated by Formula 1 below:

$$T_c = -T_e + J_e\left(\frac{d\text{SLIP}}{dt} + \frac{dNi1}{dt}\right),\qquad \text{Formula 1}$$

where Tc is the transfer torque of the engaging clutch, Te is the engine torque, Je is the moment of inertia of the engine, SLIP is Ni1-Ne, Ni1 is the speed of the engaging input shaft, and Ne is the engine speed.

At the transfer torque maintaining step S50, the slip rate is calculated based on the difference between the speed of the engaging input shaft and the engine speed with respect to the difference between the speed of the engaging input shaft and the speed of the disengaging input shaft.

That is, the slip rate is calculated by Formula 2 below:

$$\text{Slip rate} = \frac{Ni1 - Ne}{Ni1 - Ni2},\qquad \text{Formula 2}$$

where Ni2 is the speed of the disengaging input shaft.

At the transfer torque maintaining step S50, the reference value of the slip rate may be 9/10 or greater. When the engine speed is close to and substantially the same as the speed of the engaging input shaft, the transfer torque maintaining step S50 is completed and the next shift completing step S60 is carried out.

At the shift completing step S60, the transfer torque of the engaging clutch is gradually decreased by the amount of torque that it is increased at the transfer torque increasing step S40 in order to slightly decrease the transfer torque of the engaging clutch while the engine speed approaches at the speed of the engaging input shaft, thereby preventing shock.

According to various aspects of the invention as set forth above, if it is determined that the vehicle has entered the rough terrain, the transfer torque of the engaging clutch is controlled as follows: The speed change rate of the engaging clutch is calculated based on the speed of the engaging clutch right before the vehicle enters the rough terrain and fixed to a preset value. In this state, the engine speed and the speed of the engaging clutch are introduced to be synchronized with each other through the transfer torque increasing step S40 and the transfer torque maintaining step S50. The transfer torque of the engaging clutch is gradually reduced at the shift completing step S60. It is consequently possible to complete the shifting while preventing shock. It is also possible to firmly and smoothly complete the shifting with no difficulty in transmission control caused by the speed of the engaging clutch that would otherwise irregularly and rapidly change on the rough terrain, thereby improving the endurance of the clutches. It is also possible to control the quality of shifting to be reliable regardless of road conditions, thereby contributing to the improved value of the vehicle.

For reference, in FIG. 2, during the transfer torque increasing step S40, the same oblique line is used regardless of whether or not the vehicle has entered the rough terrain. However, this can be different since the speed change rate of the engaging clutch continuously changes according to Formula 1. Different routes are separately indicated with a dotted line and solid line during the transfer torque maintaining step S50 and the shift completing step S60. The dotted line indicates the torque according to the invention, whereas the solid line indicates the continuously-changing speed change rate of the engaging clutch according to the related art.

In particular, when the vehicle has entered the rough terrain, the transfer torque maintaining step S50 fixes the speed change rate of the engaging clutch to a preset value, and the target transfer torque of the engaging clutch in the actual control is indicated with a preset horizontal line.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method in a vehicle having a dual clutch transmission, comprising:
determining whether or not power-off downshifting is started and whether or not torque handover is started;
determining whether or not the vehicle has entered a rough terrain, when the torque handover is started;
determining and storing a speed change rate of an engaging input shaft before the vehicle enters the rough terrain when it is determined that the vehicle has entered the rough terrain;
determining a target transfer torque of an engaging clutch based on the speed change rate of the engaging input shaft that is stored during determining and storing the speed change rate of the engaging input shaft when the vehicle has entered an actual shifting section, and increasing a transfer torque of the engaging clutch by an amount until arriving at the target transfer torque of the engaging clutch;
controlling the target transfer torque of the engaging clutch to be maintained until a slip rate arrives at a reference value after determining the target transfer torque of the engaging clutch; and
completing the power-off downshifting by reducing the transfer torque of the engaging clutch by the amount of torque that the engaging clutch was increased at the step of increasing the transfer torque of the engaging clutch when controlling the target transfer torque of the engaging clutch is completed.

2. The shift control method according to claim 1, wherein determining whether or not the vehicle has entered the rough terrain comprises determining that the vehicle has entered the rough terrain when a present speed change rate of the engaging input shaft differs from an average speed change rate of the engaging input shaft for a reference period of time by a marginal value or greater.

3. The shift control method according to claim 1, wherein determining the target transfer torque of the engaging clutch comprises determining the target transfer torque of the engaging clutch by a formula of $$T_c = -T_e + J_e\left(\frac{d\text{SLIP}}{dt} + \frac{dNi1}{dt}\right),$$

wherein the Tc is the transfer torque of the engaging clutch, the Te is an engine torque, the Je is a moment of inertia of an engine, and the SLIP is Ni1-Ne, wherein the Ni1 is a speed of the engaging input shaft, and the Ne is an engine speed.

4. The shift control method according to claim 1, wherein controlling the target transfer torque of the engaging clutch comprises determining the slip rate based on a difference between a speed of the engaging input shaft and an engine speed with respect to a difference between a speed of the engaging input shaft and a speed of the disengaging input shaft.

5. The shift control method according to claim 4, wherein, in controlling the target transfer torque of the engaging clutch, a reference value of the slip rate is 9/10 or greater.

6. The shift control method according to claim 1, wherein determining the slip rate comprises determining the slip rate by a formula of $$\text{Slip rate} = \frac{Ni1 - Ne}{Ni1 - Ni2},$$

wherein the Ni2 is a speed of the disengaging input shaft.

* * * * *